US007493366B1

(12) United States Patent
Bowie et al.

(10) Patent No.: US 7,493,366 B1
(45) Date of Patent: Feb. 17, 2009

(54) SYSTEM AND METHOD FOR PROCESSING CUSTOMER REQUESTS RELATING TO UNSOLICITED COMMERCIAL EMAIL AND OTHER SERVICE DISRUPTIONS

(75) Inventors: David J. Bowie, Salem, MA (US); John F. Buford, Lexington, MA (US); Xiaolan Huang, Boston, MA (US)

(73) Assignee: Verizon Laboratories, Inc., Waltham, MA (US)

( * ) Notice: Subject to any disclaimer, the term of this patent is extended or adjusted under 35 U.S.C. 154(b) by 696 days.

(21) Appl. No.: 09/797,405

(22) Filed: Mar. 1, 2001

(51) Int. Cl.
*G06F 15/16* (2006.01)
*G06F 15/173* (2006.01)

(52) U.S. Cl. ........................ 709/206; 709/225
(58) Field of Classification Search ............. 709/206, 709/203, 202, 225; 707/10, 102; 715/733, 715/745; 370/252, 237
See application file for complete search history.

(56) References Cited

U.S. PATENT DOCUMENTS

| | | | | |
|---|---|---|---|---|
| 4,464,543 A * | 8/1984 | Kline et al. | ................. | 379/224 |
| 5,404,518 A * | 4/1995 | Gilbertson et al. | ............. | 707/3 |
| 5,537,618 A * | 7/1996 | Boulton et al. | .............. | 715/745 |
| 5,608,720 A * | 3/1997 | Biegel et al. | ................. | 370/249 |
| 5,668,953 A * | 9/1997 | Sloo | .............................. | 705/1 |
| 5,895,450 A * | 4/1999 | Sloo | .............................. | 705/1 |
| 5,908,383 A * | 6/1999 | Brynjestad | .................. | 600/300 |
| 6,026,500 A * | 2/2000 | Topff et al. | .................... | 714/26 |
| 6,052,709 A * | 4/2000 | Paul | ............................. | 709/202 |
| 6,073,167 A | 6/2000 | Poulton et al. | ............. | 709/206 |
| 6,076,100 A * | 6/2000 | Cottrille et al. | ............. | 709/203 |
| 6,147,975 A * | 11/2000 | Bowman-Amuah | ......... | 370/252 |
| 6,177,932 B1 * | 1/2001 | Galdes et al. | ............... | 715/733 |
| 6,282,565 B1 * | 8/2001 | Shaw et al. | ................. | 709/206 |
| 6,289,378 B1 * | 9/2001 | Meyer et al. | ................. | 709/223 |
| 6,301,621 B1 * | 10/2001 | Haverstock et al. | ......... | 709/246 |
| 6,336,133 B1 * | 1/2002 | Morris et al. | ................ | 709/204 |
| 6,339,784 B1 * | 1/2002 | Morris et al. | ................ | 709/204 |
| 6,353,446 B1 * | 3/2002 | Vaughn et al. | .............. | 715/733 |
| 6,356,936 B1 * | 3/2002 | Donoho et al. | .............. | 709/206 |
| 6,381,592 B1 * | 4/2002 | Reuning | ......................... | 707/3 |
| 6,385,310 B1 * | 5/2002 | Holiday, II | .................. | 379/120 |
| 6,389,426 B1 * | 5/2002 | Turnbull et al. | ............. | 707/102 |
| 6,393,465 B2 * | 5/2002 | Leeds | .......................... | 709/207 |
| 6,546,416 B1 * | 4/2003 | Kirsch | ......................... | 709/206 |
| 6,574,614 B1 * | 6/2003 | Kesel | ........................... | 706/52 |
| 6,618,504 B1 * | 9/2003 | Yoshino | ...................... | 382/187 |
| 6,678,355 B2 * | 1/2004 | Eringis et al. | ................. | 379/22 |
| 6,687,740 B1 * | 2/2004 | Gough et al. | ............... | 709/206 |
| 6,732,273 B1 * | 5/2004 | Byers | ......................... | 713/193 |
| 6,748,422 B2 * | 6/2004 | Morin et al. | ................. | 709/206 |
| 6,782,391 B1 * | 8/2004 | Scher | ......................... | 707/102 |
| 6,822,940 B1 * | 11/2004 | Zavalkovsky et al. | ........ | 370/237 |
| 6,912,502 B1 * | 6/2005 | Buddle et al. | .................. | 705/1 |
| 6,965,919 B1 * | 11/2005 | Woods et al. | ............... | 709/206 |

(Continued)

*Primary Examiner*—William C Vaughn, Jr.
*Assistant Examiner*—Kristie D Shingles

(57) ABSTRACT

A system and method for automatically processing and responding to large volumes of customer requests regarding Unsolicited Commercial Email (UCE) and other service disruptions. The process combines manual and automated steps, and includes routing, filtering, aggregating, validating, ticketing, custom and automated responses, tracking, analyzing, and closing each validated request. The process can be used by the Customer Support Center (CSC) of the Internet Service Provider (ISP) to insure that all complaints are handled successfully, that promotion of complaints is done correctly, that legal aspects of certain criminal or fraud related incidents are handled correctly, and that portions of the processing of complaints are handled automatically.

18 Claims, 7 Drawing Sheets

U.S. PATENT DOCUMENTS

| | | | |
|---|---|---|---|
| 7,111,318 B2 * | 9/2006 | Vitale et al. | 725/107 |
| 7,127,680 B2 * | 10/2006 | Pang | 715/751 |
| 7,149,778 B1 * | 12/2006 | Patel et al. | 709/206 |
| 7,283,969 B1 * | 10/2007 | Marsico et al. | 705/1 |
| 2001/0010591 A1 * | 8/2001 | Kusaka | 359/371 |
| 2001/0044729 A1 * | 11/2001 | Pomerance | 705/1 |
| 2001/0053991 A1 * | 12/2001 | Bonabeau | 705/7 |
| 2002/0103693 A1 * | 8/2002 | Bayer et al. | 705/10 |
| 2002/0129111 A1 * | 9/2002 | Cooper | 709/207 |
| 2005/0144238 A1 * | 6/2005 | Morin et al. | 709/206 |
| 2005/0165285 A1 * | 7/2005 | Iliff | 600/300 |
| 2005/0172213 A1 * | 8/2005 | Ralston et al. | 715/500 |
| 2006/0031303 A1 * | 2/2006 | Pang | 709/206 |
| 2006/0031346 A1 * | 2/2006 | Zheng et al. | 709/206 |

* cited by examiner

SYSTEM AND METHOD FOR PROCESSING CUSTOMER REQUESTS RELATING TO UNSOLICITED COMMERCIAL EMAIL AND OTHER SERVICE DISRUPTIONS

BACKGROUND OF THE INVENTION

1. Field of the Invention

The present invention relates to the distribution of information over a computer network, and in particular, to a system and method for processing and responding to large volumes of customers request relating to unsolicited commercial email (UCE) and other service disruptions over a computer network, such as the Internet.

2. Description of the Related Art

The Internet is fast proving to be one of the most significant technological developments of the current era. Originally developed in the United States as a cooperative effort of the United States Government known as the Advanced Research Project Agency Network (ARPANET) to tie universities and research and development organization to their military customers, the Internet has now exploded to link computer users world-wide. The Internet is an interconnected system of computer networks of varying types with terminals, usually computer stations, communicating with each other through a common communication protocol, e.g. Transmission Control Protocol/Internet Protocol (TCP/IP). Through this interconnected system of computer networks, the Internet serves as the underlying infrastructure that facilitates a global system of communication known as the world wide web.

Piggy-backed input on the Public Switched Telephone Network (PSTN), the Internet is available to anyone with a telephone line and a computer with modem. Both businesses and private users are taking advantage of the Internet in rapidly increasing numbers for communications of a diverse nature.

One reason for the rapid integration of the Internet into daily activities is that the Internet provides improved efficiencies in communication. For example, messaging over the Internet is very quick, even to remote locations throughout the world. Responses are also typically very quick.

Internet communication has been minimally regulated and continues to involve lowering costs, typically requiring only the cost of a computer terminal and a periodic Internet Service Provider (ISP) fee. Additionally, Internet communications are pervasive, providing easy access from every user on the Internet to millions of other users, almost regardless of physical location.

Because of these efficiencies, one form of communication that has quickly migrated to the Internet is advertising. Advertisers are able to generate and send bulk mailings at a fraction of the cost of mail, telephone, radio, and other commonly accepted types of advertising. Programs exist that quickly merge commercial advertisement messages with reference lists of Internet user addresses and automatically send out many thousands of advertisements in a single day at almost no cost to the sender. Instead, a substantial portion of the costs is born by the intermediary transmission entities and the end users.

Unfortunately, the indiscriminate nature of broadcast advertising over the Internet has led to many problems. To deliver a message in volume and thereby take advantage of the efficiencies of the Internet, senders frequently use commercially generated reference lists of Internet user addresses. These reference lists are very labor intensive and costly to compile in any manner other than randomly. Thus, many Internet broadcasters use random lists of user addresses to send their advertising, transmitting unwanted messages to a large number of disinterested Internet users for every interested Internet user.

Internet users typically resent this random "junk mail" cluttering up their cyberspace mailboxes. Consequently, random advertising over the Internet in the form of electronic mail is commonly referred to, rather unaffectionately, as "spamming." Angry recipients of this type of Unsolicited Commercial Email (UCE) advertising have gone so far as to react in simultaneous, damaging, electronic backlashes aimed at particularly notorious junk mail-generating entities.

Large volumes of electronic customer requests (5,000-10,000/day) sent to the Internet Service Provider (ISP) regarding UCE advertisements and other service disruptions are handled by a help desk or customer support center (CSC). Analysts open up each request or complaint, search for the offender's IP address and sent timestamp, then identify the account, categorize the type of incident, analyze the case, and submit a ticket. Portions of the process are done manually. Email requests usually deal with problems related to UCE, but may also include security intrusion reports.

The ISP may be required by law to respond to every complaint that pertains to its network or hosting service. The ISP must maintain a tracking system to insure that each validated complaint is properly handled. The processing is complicated by several conditions, including: 1) analysis of the complaint may involve conditions that change over time and may no longer exist at the time of analysis; 2) many complaints may deal with the same problem, but may be difficult to associate with the other complaints due to different complaint formats; and 3) the customer network itself may change during the time period since the complaint took place. Currently, the ISP has an ad hoc system that may not insure that all complaints are handled correctly, and the introduction of automation into the current environment is difficult.

Accordingly, the inventors of the present invention have recognized a need for a system and method that could be used by an ISP to insure that all spamming complaints are handled successfully, that processing of complaints is done correctly, that legal aspects of certain criminal or fraud related incidents are handled correctly, and that portions of the processing of complaints are handled automatically to the extent feasible.

SUMMARY OF THE INVENTION

To solve these and other problems, a system and method of the invention has been developed by the inventors that involves information flow between an UCE source, a customer, an ISP Customer Service Center (CSC) or help desk, a Newsgroup, and the like, to process unsolicited commercial email over a network. First, the ISP help desk receives a complaint regarding an incident from a customer over a computer network, such as the Internet. Next, the ISP help desk validates the complaint by determining whether the complaint includes sufficient information that relates to the source of the complaint. For example, the complaint should include the header and body portions for a UCE and UseNet complaint, and should include trace information from the IP address for a Security-related complaint. Then, the ISP help desk processes the validated complaint by adding the complaint to an existing ticket when duplicate, similar incidents exist. A duplicate incident is an incident that already has been ticketed by the ISP. A similar incident is an incident in which the first line of text in the body of the offending email is substantially identical to an earlier UCE, the IP address and the timestamp in the header of the offending email is substantially identical to an earlier UCE, or the website in the body of the offending email is substantially identical to an earlier UCE. Alternatively, the ISP help desk issues a ticket for the complaint when no duplicate incidents exist. Then, the ISP help desk determines whether the incident is serious based on the number of similar incidents over a predetermined period of time or the nature of the unauthorized access for a security-related complaint. If the incident is not serious, then the ISP help desk issues a warning to the source of the complaint. If the incident is serious, then the ISP help desk terminates the service provided by the source of the complaint.

Various aspects and advantages of this invention will become apparent to those skilled in the art from the following detailed description of the preferred embodiment, when read in light of the accompanying drawings.

DESCRIPTION OF THE PREFERRED EMBODIMENT

Figure 1A:
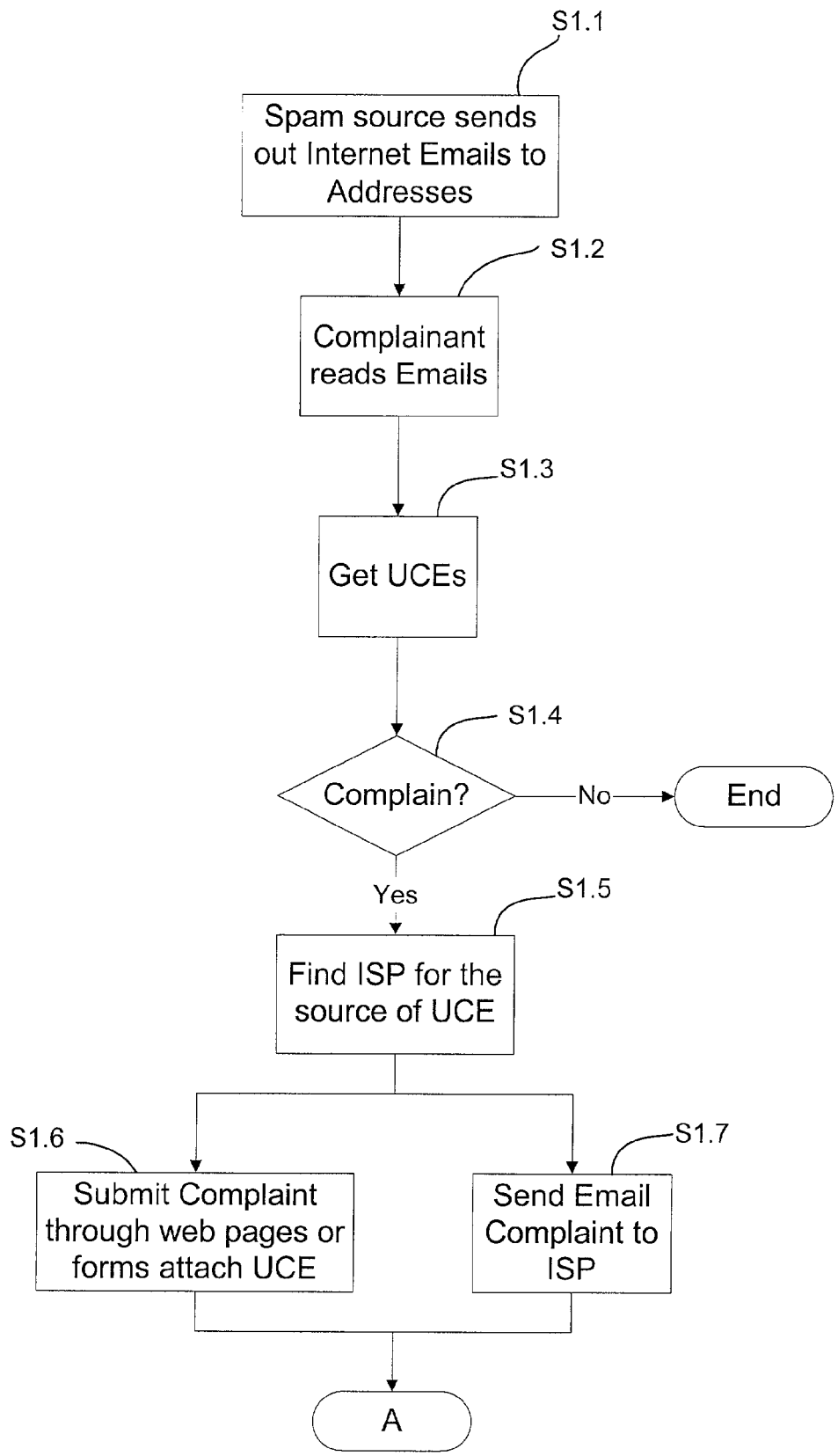
FIGS. 1A, 1B and 1C show a flowchart of the invention for initiating a UCE, UseNet or Security complaint, respectively, and sending the complaint to the ISP.
Figure 1B:
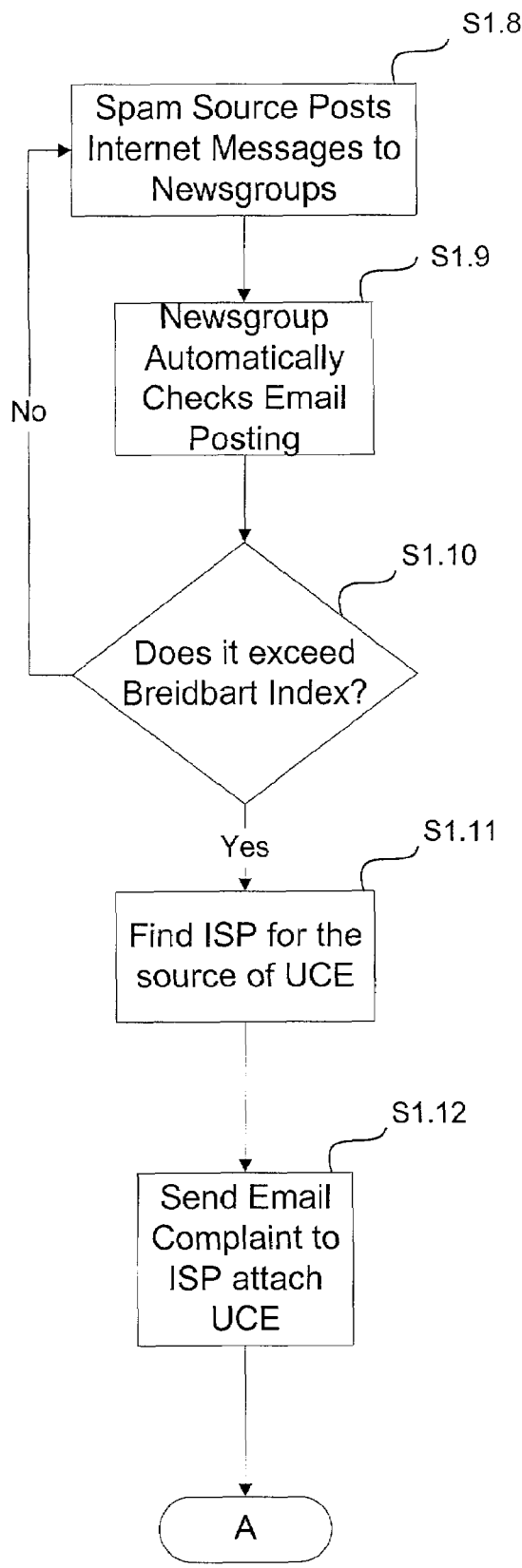
Figure 1C:
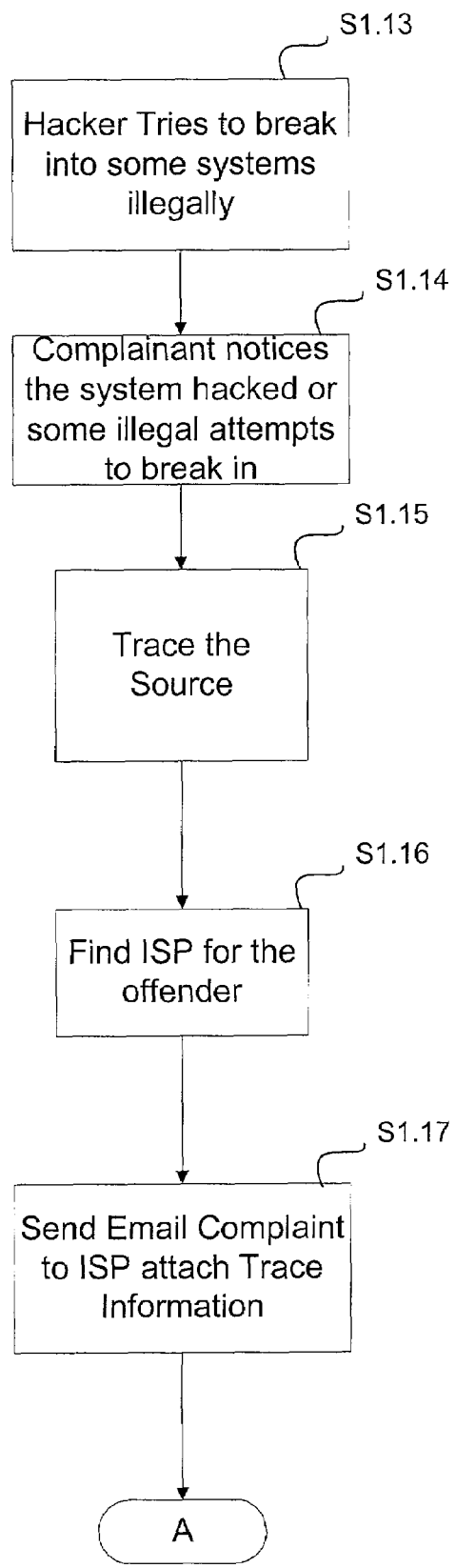

Referring now to FIGS. 1A, 1B and 1C, a system and method of the invention for processing and responding to customer requests relating to Unsolicited Commercial Email (UCE) and other service disruptions will now be described. The invention contemplates complaints that fall into at least one of three different categories: UCE, UseNet and Security complaints. However, it will be appreciated that the invention is not limited by the different types of complaints discussed herein, and that the invention can be applied to other similar types of complaints that may occur in a network environment.

Referring to FIG. 1A, a UCE complaint is initiated when the source of the UCE or spam sends an email over a computer network, such as the Internet, to one or more Internet addresses (Step S1.1). For brevity, the description herein discusses UCE, UBE (spam uttered by nonprofit and advocacy groups whose motives are not commercial) and other service disruptions on the Internet. The Internet end-user that receives the UCE, commonly known as the complainant, reads the email sent from the spam source (Step S1.2) and receives one or more UCEs (Step S1.3). If the Internet addressee decides to complain about the UCE from the spam source in Step S1.4, then the complainant finds the Internet Service Provider (ISP) that is the source of the UCE (Step S1.5). This can be accomplished by using well-known tools available on the Internet, such as Spamcop, and the like. Alternatively, the complainant can look at the header of the UCE to determine the source of the UCE. For example, a header of the UCE with Bob@aol.com identifies the ISP as America Online. At this point, the complainant can submit a complaint to the help desk of the complainant's ISP (Tier 1 or 2) through web pages or by sending a form attaching the UCE (Step S1.6) or by sending an email to the ISP attaching the UCE (Step S1.7).

Referring now to FIG. 1B, a UseNet complaint is initiated when the spam source posts a message to one or more Newsgroups on the Internet or other network (Step S1.8). Then, a cancelbot of the Newsgroup automatically checks the email posting (Step S1.9). Next, the cancelbot of the newsgroup determines whether the message exceeds the Breidbart Index (BI) (Step S1.10). It will be appreciated that some Newsgroups may use an administrator or moderator instead of the cancelbot to automatically check email postings. The Breidbart Index is a measurement of the severity of spam invented by long-time hacker Seth Breidbart, used for programming cancelbots. The Breidbart Index takes into account the fact that excessive multi-posting (EMP) is worse than excessive cross-posting (ECP). The Breidbart Index is computed as follows: For each article in a spam, take the square-root of the number of newsgroups to which the article is posted. The Breidbart Index is the sum of the square roots of all of the posts in the spam. For example, one article posted to nine newsgroups and again to sixteen newsgroups would have a Breidbart Index as follows:

$$\text{Breidbart Index} = \sqrt{9} + \sqrt{16} = 7.$$

It is generally agreed that a spam is cancelable if the Breidbart Index exceeds, for example, twenty in number.

The Breidbart Index accumulates over a 45-day window. Ten articles yesterday and ten articles today and ten articles tomorrow add up to a 30-article spam. Spam fighters will often reset the count if you can convince them that the spam was accidental and/or you have seen the error of your ways and won't repeat it. Breidbart Index can accumulate over multiple authors. For example, if a "Make Money Fast" pyramid scheme exceeded a Breidbart Index of twenty in the past, then the pyramid scheme still would be considered a "cancel on sight".

If the message does not exceed the Breidbart Index, then the process will return to Step S1.8. If the Breidbart Index is exceeded, then the newsgroup finds the ISP for the source of the UCE (Step S1.11). This can be accomplished by the administrator or moderator using well-known tools available on the Internet, such as Spamcop, that search for the owner of the IP address of the source of the UCE. Alternatively, the administrator or moderator can determine the IP address of the source of the UCE from the header and body of the UCE, for example, yahoo.com. Then, the newsgroup sends an email complaint to the ISP attaching the UCE (Step S1.12).

Referring now to FIG. 1C, a Security complaint is initiated by the victim of an authorized attempt to break into or access a computer system or network (Step S1.13). Then, the complainant notices that there was an unauthorized attempt, rather successful or not, has been made by an offender or hacker (Step S1.14). Next, the complainant traces the source of the attempted break into the system (Step S1.15). For example, the complainant may use the system log file to trace the IP address of the hacker. The complainant then finds the ISP of the offender by using well-known tools available on the Internet to perform an IP address lookup (Step S1.16). The trace information is attached in an email complaint to the ISP (Step S1.17).

Figure 2:
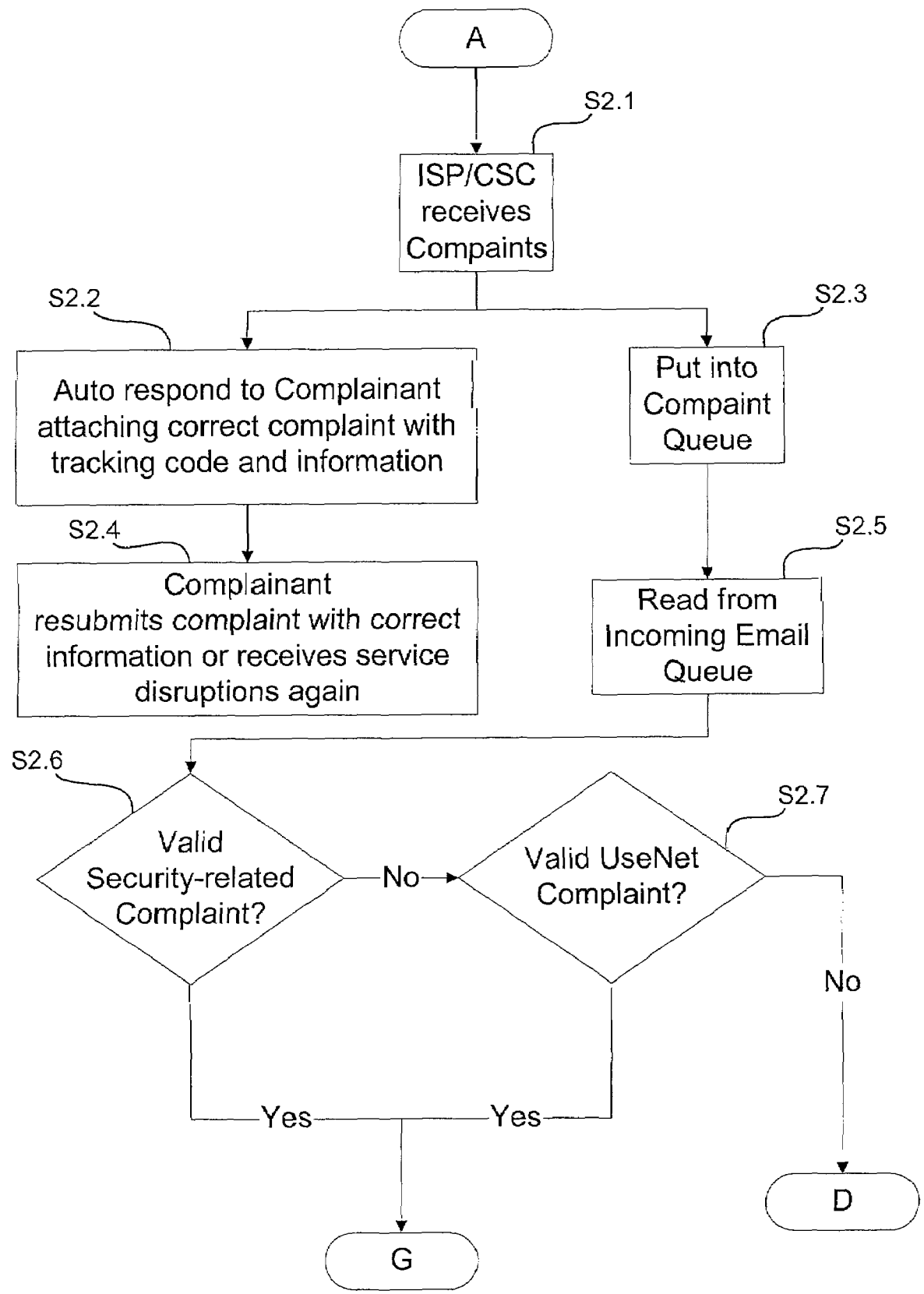
FIG. 2 shows a flowchart of the invention for identifying UseNet and Security complaints received at the ISP.

Referring now to FIG. 2, the Level 1 or Level 2 Customer Service Center (CSC) of the ISP receives one or more complaints from one or more complainants (Step S2.1). It should be appreciated that in most ISPs, the Level 1 (or Tier 1) CSC answers incoming telephone calls, and the Level 2 (or Tier 2) CSC provides low-level technical support. Once a complaint is received, the CSC may automatically respond to the complainant with the tracking code for that complaint and also indicating a correct complaint form (Step S2.2). For UCE and UseNet complaints, the correct complaint form should attach the offending email with both the header and the body sections. For security complaints, the correct complaint form should have trace information that links to the ISP's network. Then, the CSC may put the complaint into a complaint queue (Step S2.3). If the CSC automatically responds to the complainant in Step S2.2, then the complainant can choose to resubmit the complaint if the complainant hasn't previously included the correct information or the complainant can choose to continue receiving UCEs or service disruptions (Step S2.4). If the complaint is put into the complaint queue (Step S2.3), then the CSC continues to read incoming email from the complaint queue to determine the category of the complaint (Step S2.5).

As mentioned earlier, the complaint received by the ISP can fall into a variety of categories: an UCE complaint, a UseNet complaint or a Security complaint. The Level 1 or Level 2 CSC determines whether the complaint in the complaint queue is a valid Security complaint (Step S2.6). If so, then the process continues to FIG. 5. If the complaint in the complaint queue is not a valid Security complaint, then the CSC determines if the complaint in the complaint queue is a valid UseNet complaint (Step S2.7). If so, then the process continues to FIG. 5.

Figure 3:
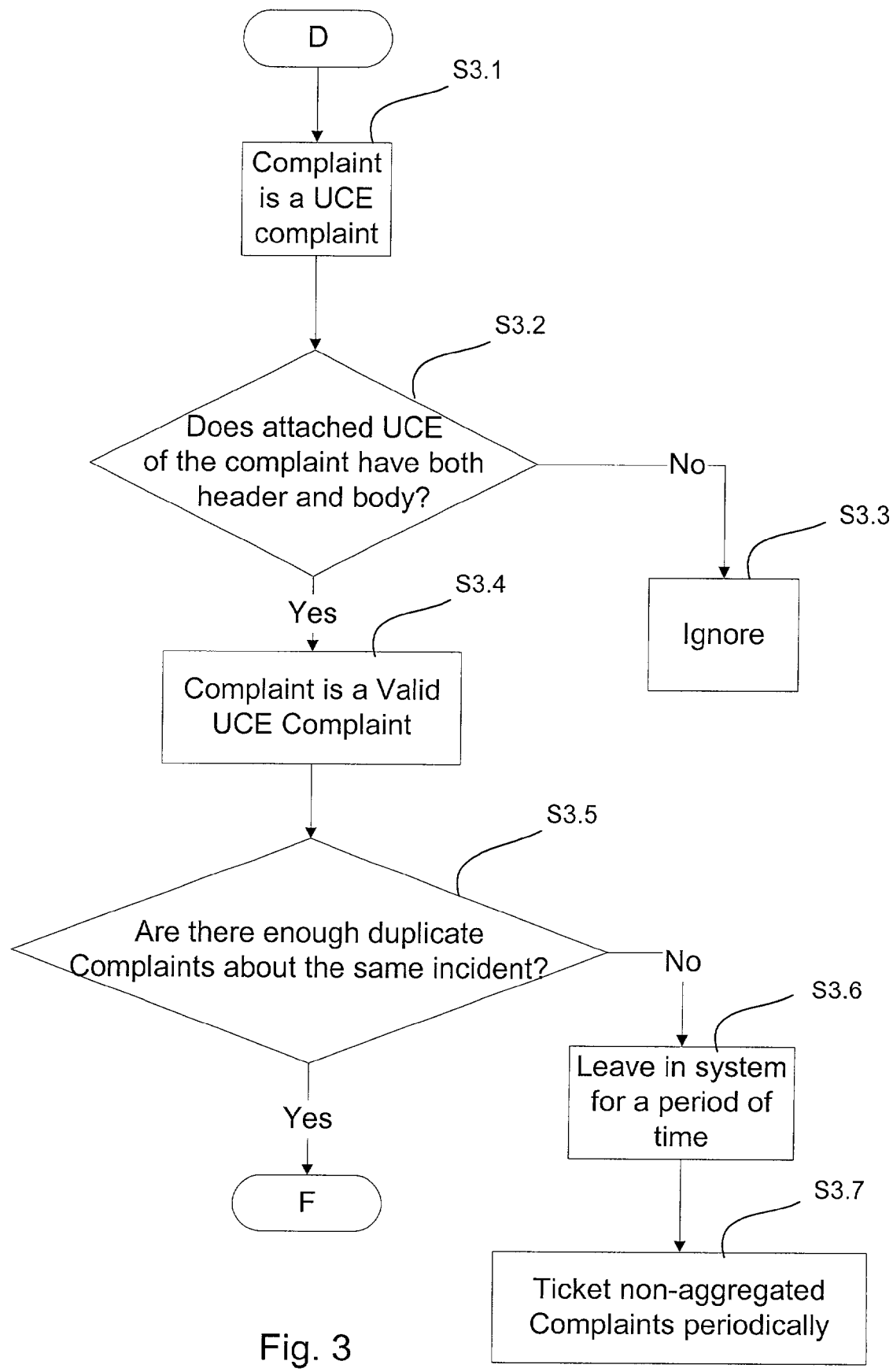
FIG. 3 shows a flowchart of the invention for validating UCE complaints received at the ISP and verifying if there is a duplicate complaint.

If the complaint in the complaint queue is not a valid Security or UseNet complaint, then the process has determined that the complaint is a UCE complaint (Step S3.1), as shown in FIG. 3. However, it will be appreciated that the invention can be practiced with other categories of complaints and that Level 1 CSC can determine whether the complaint is a valid complaint for these other categories in a manner similar to the category of complaints described herein. Then, the CSC determines whether the complaint read in the complaint queue includes the offending email with both header and body sections (Step S3.2). The header and body sections contain the IP address and timestamp of the source of the offending email, or the owner of the website and enables the ISP to determine when the customer logged into the system. If not, the CSC ignores the complaint (Step S3.3). If so, then the CSC determines whether the complaint is a valid UCE complaint (Step S3.4). Next, the CSC determines whether there are a sufficient number of duplicate aggregated complaints about the same incident in the complaint queue (Step S3.5). A sufficient number of complaints will depend on the policy of the ISP. For example, an ISP may have a policy that states that 3-5 complaints within a time period of one week may be a sufficient number of complaints. The same incident can be defined by the ISP in a number of ways: 1) the same first line of text in the body of the UCE; 2) the same website in the body of the UCE; and 3) the same IP address and timestamp in the body of the UCE. If not, then the CSC leaves the complaint in the system for a period of time (Step S3.6). The period of time will also depend on the policy of the ISP. For example, the ISP may have a policy that states that the CSC will leave the complaint in the system for one week. Then, the CSC issues a ticket for non-aggregated complaints on a periodic basis (Step S3.7).

Figure 4:
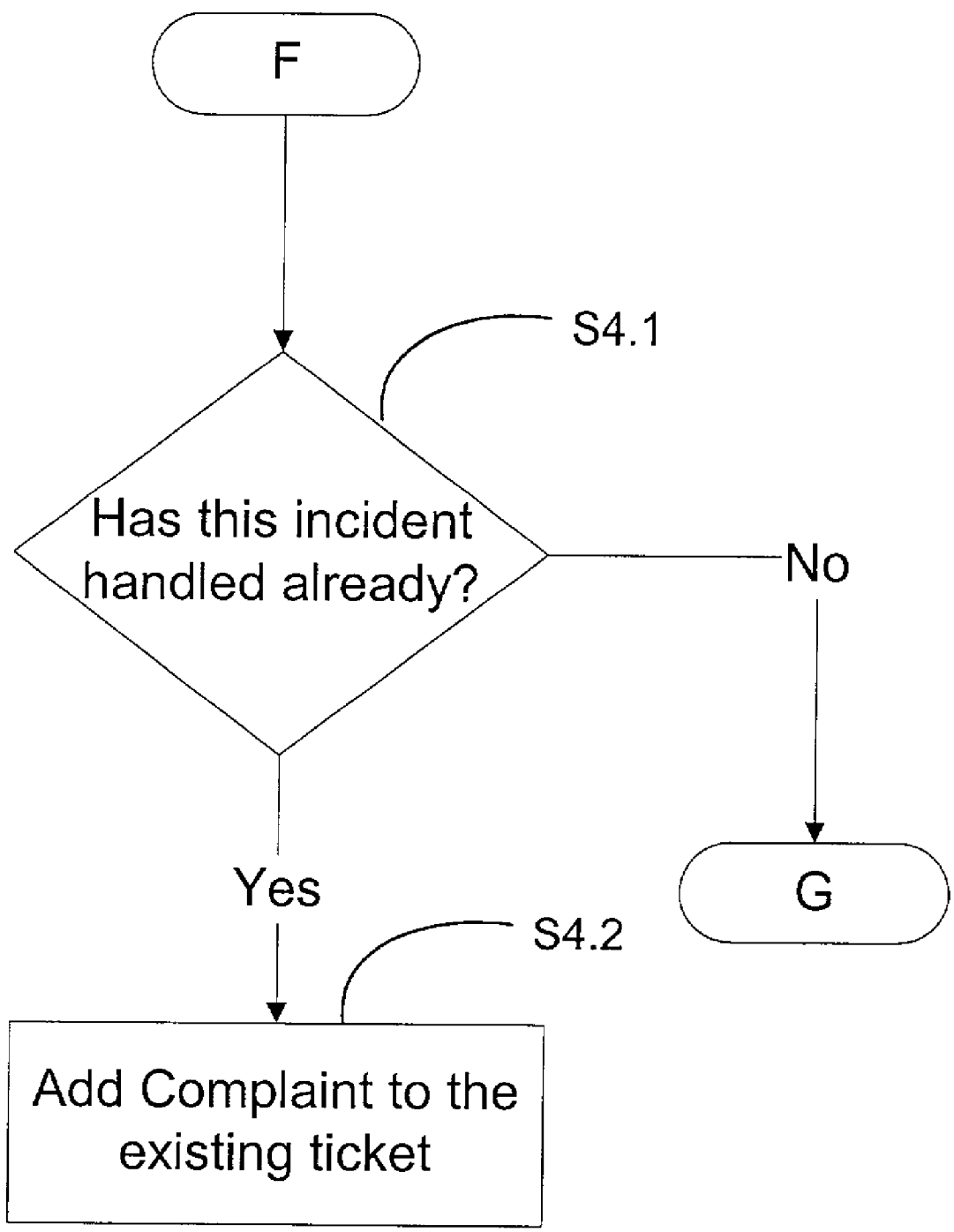
FIG. 4 shows a flowchart of the invention for verifying if the incident was previously ticketed.

If in Step S3.5, there are enough duplicate complaints about the same incident in the complaint queue, then the CSC determines whether the complaint has been previously processed, i.e., already ticketed by the CSC (Step S4.1), as shown in FIG. 4. If so, then the CSC adds the complaint to the existing ticket (Step S4.2).

Figure 5:
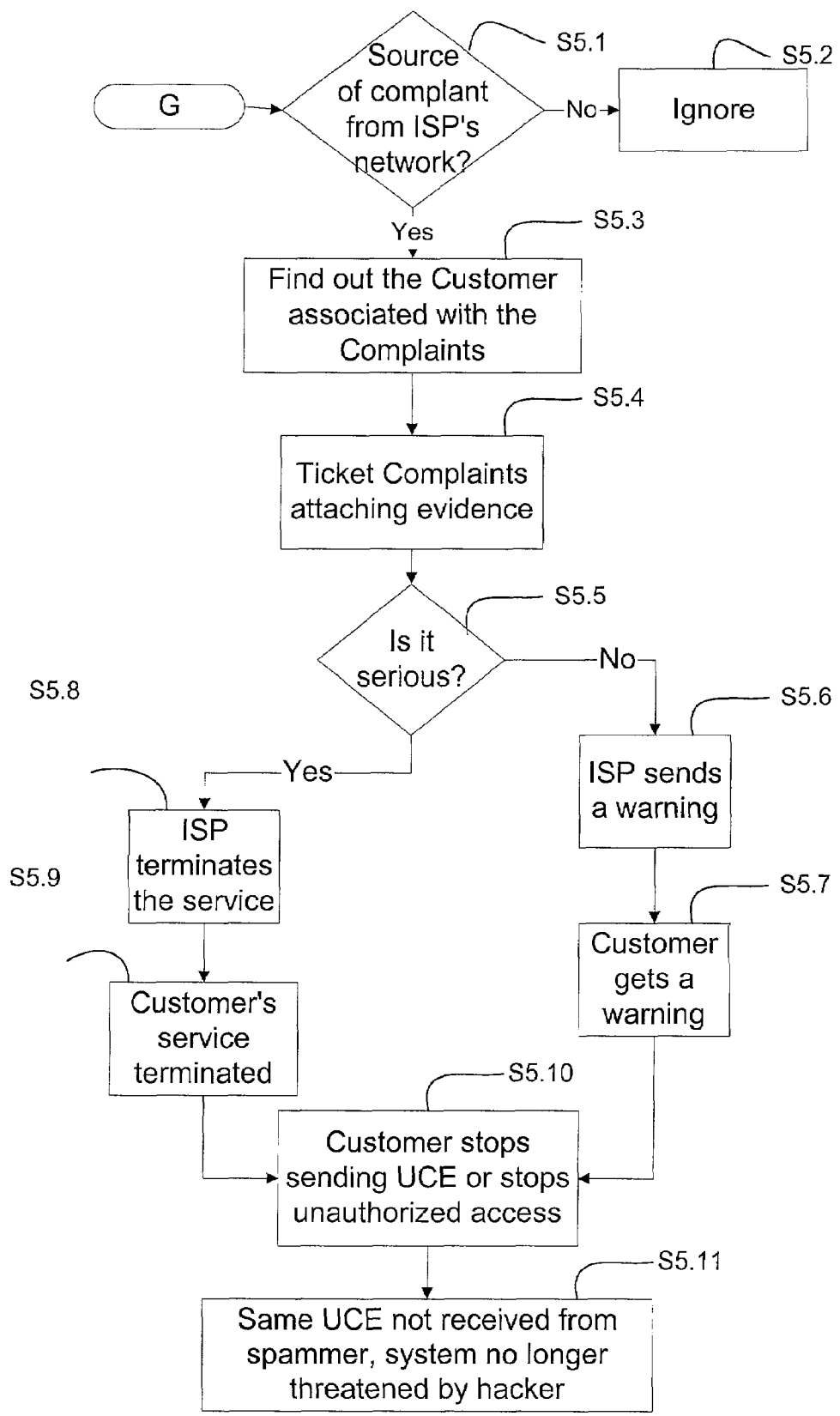
FIG. 5 shows a flowchart of the invention for handling complaints by issuing a warning or terminating the service.

If the Level 1 or Level 2 CSC has not previously handled the complaint, then the process proceeds to "G" in FIG. 5 and the CSC finds out whether the source of the complaint is from the ISP's network (Step S5.1). If not, then the complaint is ignored (Step S5.2). If so, then the CSC finds out the customer associated with the complaints by the header and body sections of the attached UCE in the complaint, or the trace information (Step S5.3). Then, the CSC issues a ticket for the complaints attaching evidence, such as the header or body portions for UCE or UseNet complaints, or the trace information for a Security-related complaint (Step S5.4). Next, the CSC determines whether the complaints are serious based on the number of similar incidents over a predetermined time period or the nature of the unauthorized access (Step S5.5). If the complaints are not serious, then the CSC issues a warning (Step S5.6) and the customer who is the spam source or hacker receives a warning issued by the CSC (Step S5.7). If in Step S5.5 the CSC determines that the complaints are serious, then the CSC will terminate the service (Step S5.8) and the service provided to the customer who is the spam source or hacker is terminated (Step S5.9). Regardless of whether the complaints are serious, the customer who is the spam source or hacker is stopped from sending UCE or trying to illegally break into the system (Step S5.10). As a result, the complainant no longer receives the offending UCE or UseNet posting from the spam source, or the hacker is stopped from illegally breaking into or unauthorized access to the system (Step S5.11).

As described above, one embodiment of the system and method of the invention has been presented as a set of process flow charts that involve information flow between the UCE source, the customer, the ISP help desk, the complainant and the news group. The flow charts define a general process by which an ISP can streamline and organize the handling of incoming complaints received electronically. This process can not be duplicated by a voice response system because the complaints involve detailed textual information. However, other systems for spam filtering or spam detection can be complimentary to the method of the invention.

It will be appreciated that a different structural embodiment of the method of the invention can occur for a small ISP as compared to a large ISP that would have corresponding different volumes of complaints to handle. For example, a relatively small ISP may coalesce the Level 1 and Level 2 CSC functions for receiving telephone calls and technical support. It will also be appreciated that the invention can be practiced with other CSC level functions, such as Level 3 and Level 4 functions for operations security and network engineering, respectively. Further, different ISPs may have different business policies regarding specific actions to be taken when receiving a complaint. These actions may vary as to the severity and threshold of the complaint.

It will also be appreciated that the invention is a reactive one with many possible variations. One variation of the illustrated embodiment of the invention may include a type of complainant self-service, for example, using a web site for the customer to process a complaint. However, the complainant self-service method may be limited to the use of non-proprietary information because some information for processing the complaint may involve information that is proprietary to the customer.

One key aspect of the invention is the efficiency for large ISPs with relatively large volumes of complaints because of the aggregation of many complaints into a group that can be processed in one or a few steps. Aggregation of complaints is difficult because each complaint may arrive at a different time, may have a different form, and may not contain the exact same UCE information. A second key aspect of the method of the invention is to distinguish different categories of complaints (UCE, UseNet newsgroup, security-related, and the like) that permits the customer service organization (ISP) to establish different tools and groups of analysts to specialize in resolving each category of complaint.

As described above, the invention provides an explicit system and process that is needed to insure that all complaints are successfully handled, that processing of complaints is done correctly, that legal aspects of certain criminal or fraud relating incidents are handled, and that portions of the process that can be automated using data processing systems can be identified to the extent possible. Without such a system and process in place, an ISP help desk would have an ad hoc system that may not insure that all complaints are handled correctly, and it will be difficult to introduce automation into such an environment.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method including one or more computers for processing a customer request relating to a service disruption over a computer network, the method comprising the steps of:
   receiving a complaint from a complainant about an incident on the computer network;
   identifying a category of the complaint;
   validating the complaint;
   ticketing the validated complaint;
   identifying a source of the complaint;
   processing the complaint, including automatically determining whether duplicate complaints exist for the same incident, wherein the duplicate complaints and the complaint each have at least one of a common first line of text in a body of an attachment, a common domain name in a body of an attachment, and a common Internet Protocol (IP) address and timestamp in a body of an attachment;
   adding the validated complaint to an existing ticket when it is determined that the duplicate complaints exist for the incident, the existing ticket including only the validated complaint and the duplicate complaints associated with the same incident; and
   sending a message to the source of the complaint.

2. The method of claim 1, wherein the processing step includes aggregating validated complaints for the identified category.

3. The method of claim 1, wherein the message comprises a warning relating to the service disruption.

4. The method of claim 1, wherein the category of complaint comprises one of Unsolicited Commercial Email (UCE) complaint, a UseNet complaint, or a security-related complaint.

5. The method of claim 4, wherein the validating step comprises determining whether the complaint includes header and body portions for a UCE or UseNet complaint.

6. The method of claim 4, wherein the validating step comprises determining whether the complaint includes trace information for a security-related complaint.

7. The method of claim 1, wherein the complaint is received by an Internet Service Provider.

8. A system for processing a customer request relating to a service disruption over a computer network, comprising:
   one or more computers connected over a network;
   a complainant that receives a service disruption from a user of the computer network;
   an organization for providing services for the complainant on the computer network, wherein the organization receives a complaint from the complainant relating to the service disruption, identifies a category of the complaint, validates the complaint, tickets the validated complaint, identifies the user of the computer network, processes the complaint, automatically determines whether duplicate complaints exist for the same service disruption, wherein the duplicate complaints and the complaint each have at least one of: a common first line of text in a body of the attached evidence; a common domain name in a body of the attached evidence; and a common Internet Protocol (IP) address and timestamp in a body of the attached evidence, and sends a message to the user relating to the complaint;
   wherein the organization aggregates validated complaints for the identified category and adds the validated complaint to an existing ticket when it is determined that the duplicate complaints exist for the service disruption, the existing ticket including only the validated complaint and the duplicate complaints associated with the same incident.

9. The system according to claim 8, wherein the organization comprises an Internet Service Provider.

10. The system according to claim 9, wherein the complainant is a customer of the Internet Service Provider.

11. The system according to claim 8, wherein the service disruption comprises one of an Unsolicited Commercial Email (UCE) complaint, a UseNet complaint, or a security-related complaint.

12. The system according to claim 8, wherein the complaint includes header and body portions for a UCE or UseNet complaint.

13. The system according to claim 8, wherein the complaint includes trace information for a security-related complaint.

14. The system according to claim 8, wherein the message is one of a warning and a service termination.

15. A method including one or more computers for processing a customer request relating to a service disruption over a computer network, the method comprising the steps of:
   receiving a complaint from a complainant about an incident on the computer network;
   identifying a category of the complaint;
   validating the complaint, including determining whether evidence of the incident is attached to the complaint;
   identifying a source of the incident based on the evidence of the incident;
   automatically determining whether duplicate complaints exist for the same incident, wherein the duplicate complaints and the complaint each have at least one of: a common first line of text in a body of the attached evidence; a common domain name in a body of the attached evidence; and a common Internet Protocol (IP) address and timestamp in a body of the attached evidence;
   sending a message to the source of the incident, wherein the evidence of the incident is attached to the message;
   determining whether the number of the duplicate complaints for the incident reaches a predetermined threshold;
   sending a warning to the source of the incident if it is determined that the number of the duplicate complaints does not meet the predetermined threshold; and
   terminating service to the source of the incident if it is determined that the number of duplicate complaints reaches the predetermined threshold.

16. A system for processing a customer request relating to a service disruption over a computer network, comprising:
   one or more computers connected over a network;

a complainant that receives a service disruption from a user of the computer network; and an organization for providing services for the complainant on the computer network; wherein the organization receives a complaint from the complainant relating to the service disruption, identifies a category of the complaint, validates the complaint, identifies the user of the computer network, processes the complaint, automatically determines whether duplicate complaints exist for the same service disruption, wherein the duplicate complaints and the complaint each have at least one of: a common first line of text in a body of the attached evidence; a common domain name in a body of the attached evidence; and a common Internet Protocol (IP) address and timestamp in a body of the attached evidence, and sends a message to the user relating to the complaint; and wherein the organization determines whether the number of the duplicate complaints for the service disruption reaches a predetermined threshold, identifies the source of the service disruption and sends a warning to the source of the service disruption if it is determined that the number of the duplicate complaints does not meet the predetermined threshold or terminates service to the source of the service disruption if it is determined that the number of the duplicate complaints reaches the predetermined threshold.

17. A method including one or more computers connected over a computer network comprising:

receiving a complaint from a complainant about an incident on the computer network;

validating the complaint, including determining whether evidence of the incident is attached to the complaint;

ticketing the validated complaint;

automatically determining whether duplicate complaints exist for the same incident, wherein the duplicate complaints and the validated complaint each have at least one of: a common first line of text in a body of attached evidence; a common domain name in the body of the attached evidence; and a common Internet Protocol (IP) address and timestamp in the body of the attached evidence;

aggregating the complaint with the duplicate complaints when it is determined that the duplicate complaints are associated with the same incident;

adding the validated complaint to an existing ticket including only the validated complaint and the duplicate complaints associated with the same incident; and processing the aggregated complaints as a group.

18. A method including one or more computers connected over a computer network comprising:

receiving a plurality of complaints about a plurality of incidents on the computer network;

validating the complaints, including determining whether evidence of the incident is attached to the complaints;

ticketing the validated complaint;

automatically determining whether the plurality of complaints includes duplicate complaints for the same one of the plurality of incidents, wherein the duplicate complaints and the validated complaint each have at least one of: a common first line of text in a body of attached evidence; a common domain name in the body of the attached evidence; and a common Internet Protocol (IP) address and timestamp in the body of the attached evidence; and automatically organizing the plurality of complaints by incident by adding one of the plurality of validated complaints associated with one of the plurality of incidents to an existing ticket including only duplicate complaints for the same one of the plurality of incidents.

* * * * *